United States Patent Office 2,968,876
Patented Jan. 24, 1961

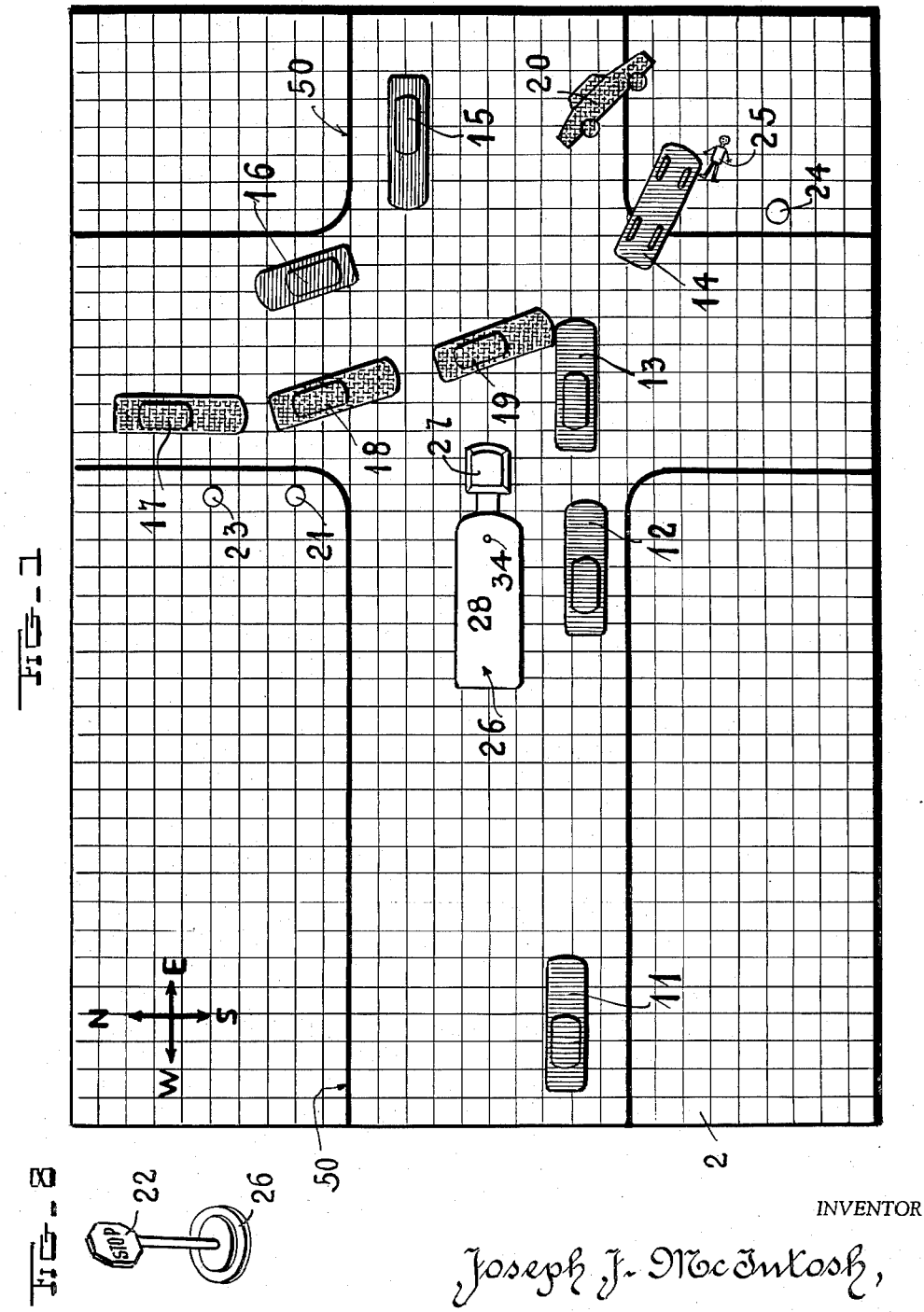

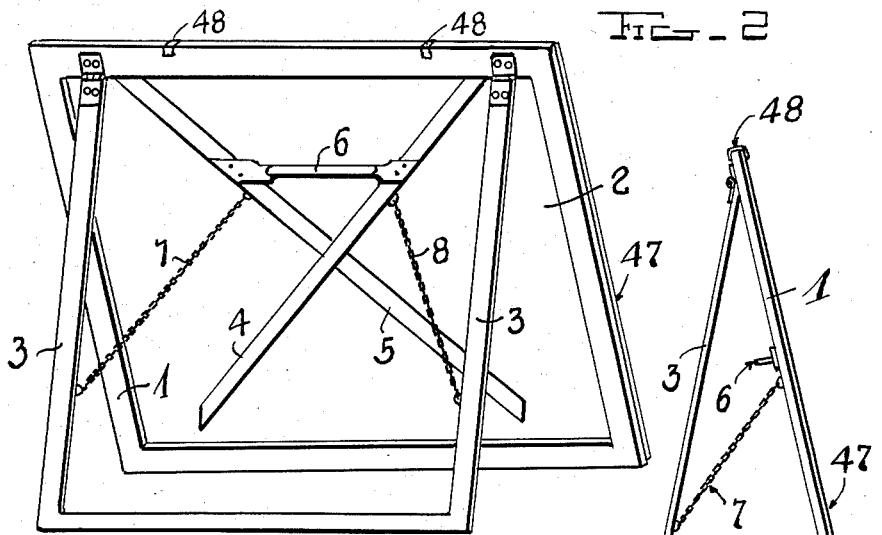
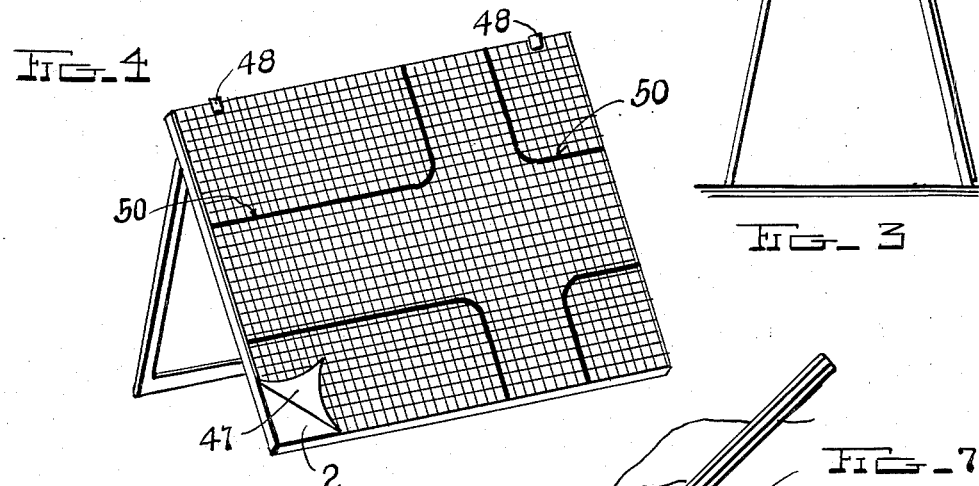
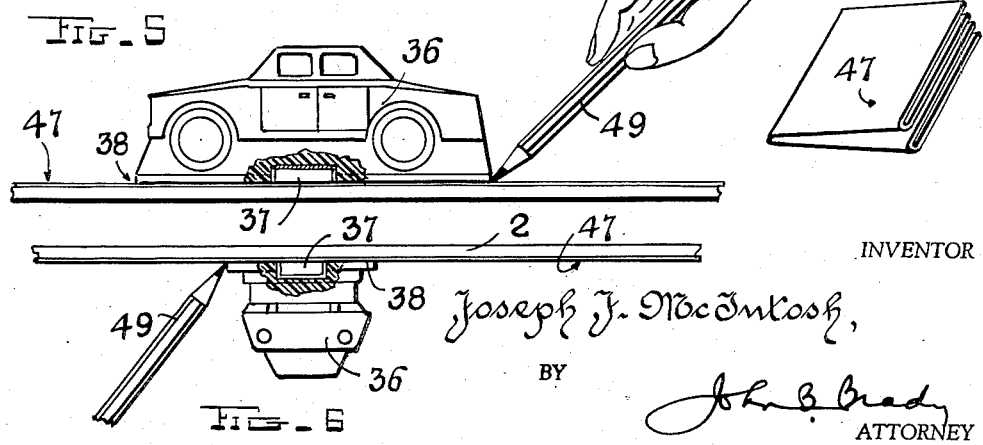

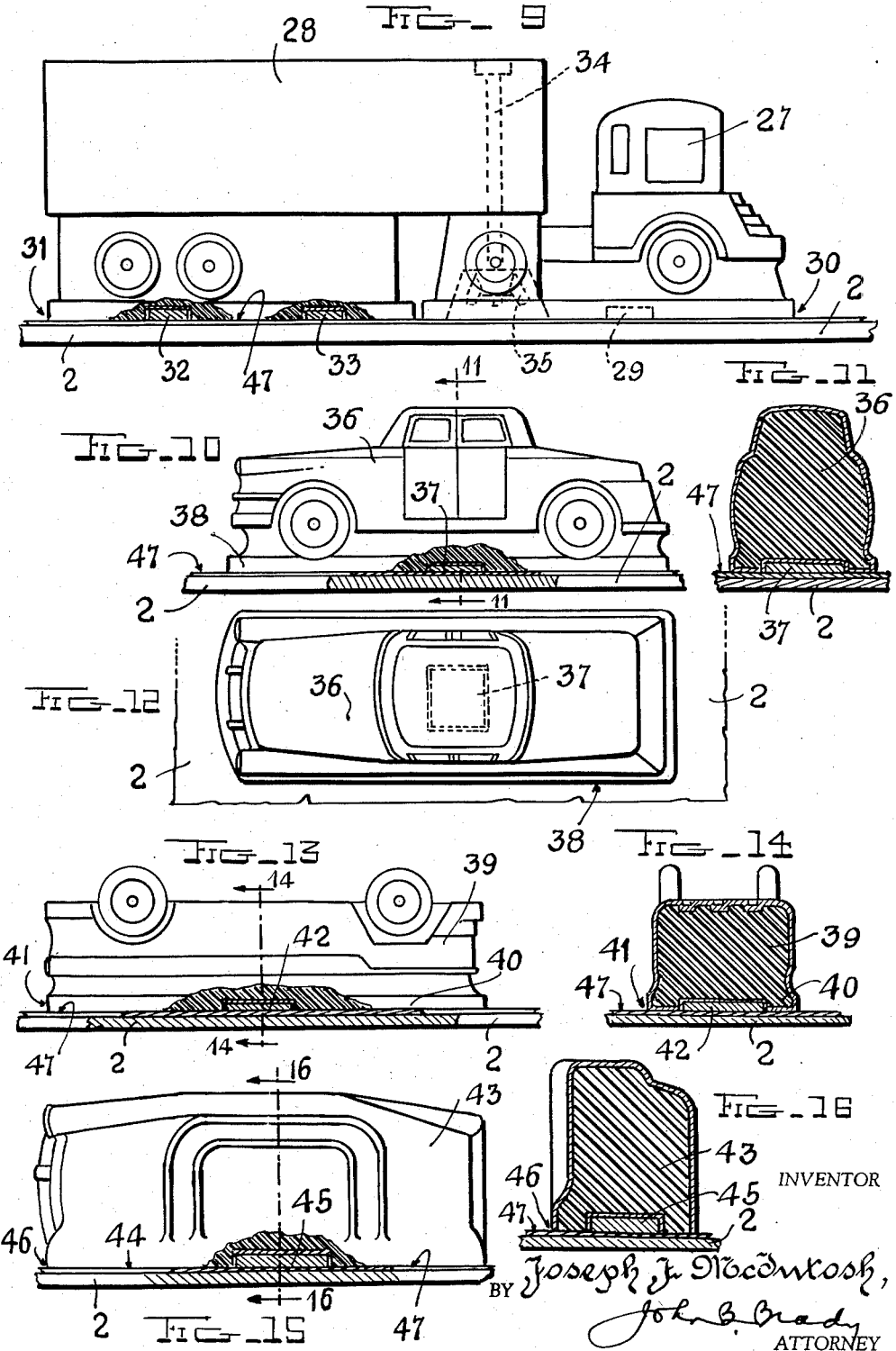

2,968,876

METHOD AND APPARATUS FOR DISPLAYING CONDITIONS OF VEHICLE TRAFFIC AND ACCIDENTS INCIDENTAL THERETO

Joseph J. McIntosh, 30 S. Court House Ave., Carlisle, Pa.

Filed May 2, 1957, Ser. No. 656,620

3 Claims. (Cl. 35—7)

My invention relates broadly to a method and apparatus for portraying conditions in traffic accidents and more particularly to a display system aiding lawyers in the investigation and trial of negligence, and other cases, and an aid to investigators, police, and instructors in the investigation, study and teaching of traffic conditions and accidents.

One of the objects of my invention is to provide a display system which may be used for portraying traffic and accident conditions in conference with witnesses and in connection with investigations and the drafting of pleadings, the taking of depositions, in pre-trial conferences, coroners' inquests, and hearings before Judicial and Arbitration Courts, and high tribunals before courts of record and appellate proceedings incident thereto for facilitating an understanding of all details of traffic accidents.

Another object of my invention is to provide a method of portraying traffic conditions incident to an accident and making a permanent record thereof for appellate proceedings incidental to trial, involving traffic accidents.

Still another object of my invention is to provide a method of portraying conditions incident to a traffic accident in which sets of scaled three-dimensional replicas of the vehicles involved in a traffic accident by which the progressive steps involving the accident may be explained and recorded by placement of the sets of replicas in the progressive positions leading up to the accident; thereby permitting a study and analysis to be made of the conditions resulting in the accident for proper determination of the responsibility therefor.

Still another object of my invention is to provide a construction of light-weight portable display board of ferrous material which may be readily marked to portray the scene of the accident in association with a removable permanent record sheet on which an outline of the scene of the accident may be readily reproduced for appellate proceedings, sets of the replicas of the vehicles involved in the accident being magnetically attachable to the display board in progressive positions portraying the conditions of the accident and in positions in which a graphic record of the progressive positions of the vehicles may be made, either with respect to the surface of the ferrous display board or upon a chart capable of being introduced in evidence and made a part of any appellate proceeding involved in the controversy.

A further object of my invention is to provide arrangements of sets of replicas of vehicles involved in a traffic controversy in which the sets of replicas of the vehicles include models, distinctively colored, magnetically attachable to the display board in normal position; in a reversed or turned-over position; and in a prone position whereby progressive steps of the accident may be illustrated in similitude and a graphic record thereof readily made, either on the surface of the display board or the surface of an explanatory graph sheet which may be introduced in evidence for consideration by an appellate tribunal.

Other and further objects of my invention reside in an arrangement of replicas of vehicles or other objects involved in the traffic accident as set forth more fully in the specification hereinafter following by reference to the accompanying drawings, in which:

Fig. 1 is a front view of the graphed panel of a display board or the front of a graphed sheet which may be temporarily mounted on the display board for reproduction thereon of the progressive positions of vehicles incident to an accident, which sheet is readily removable from the display board for forming part of the record on appeal in any proceeding in which the method and apparatus of my invention may be employed;

Fig. 2 is a rear perspective view of the lightweight display board of ferrous material employed in the system of my invention;

Fig. 3 is an end view of the display board illustrated in Fig. 2, the board showing the manner in which the graphed sheet upon which records of the progressive steps involved in an accident may be permanently made;

Fig. 4 is a front perspective view of the display board with the removable recording sheet attached thereto, preparatory to the making of a graphic record illustrating the conditions of the accident;

Fig. 5 is a schematic view showing the magnetic attachment of one of the replicas of my invention with respect to the ferrous surface of the display board of Figs. 2–4;

Fig. 6 is a view similar to the view shown in Fig. 5 but illustrating the replica of the vehicle in end elevation and showing the manner in which a peripheral outline of the replica is readily recorded on the surface of either the display board or the graphed sheet associated therewith;

Fig. 7 is a perspective view of the graphed sheet prepared on the display board of Figs. 2–4 and folded to a position in which the sheet may readily form part of the appeal record in the case for review by a higher tribunal;

Fig. 8 is a perspective view of a representative accessory used in the display system of my invention and which is depicted in this instance as a stop sign, but is representative of a variety of traffic devices or pedestrians arranged in either a direct or prone position for magnetic attachment either through the graphed sheet onto the display board or magnetically attachable directly to the ferrous surface of the display board;

Fig. 9 is an elevational view of a replica trailer-truck carrying magnetic means enabling the trailer-truck to be magnetically fastened to the ferrous surface of the display board; and Figs. 10–16 are views of a set of replicas of vehicles involved in the accident, for the display of the position of the vehicle in progressive positions on the graphed sheet or upon the display board, and wherein:

Fig. 10 is an elevational view of a replica partially broken away to show the magnetic means therein attached to the ferrous surface of the display board through the graphed sheet;

Fig. 11 is a transverse sectional view on line 11—11 of Fig. 10;

Fig. 12 is a top plan view of the replica illustrated in Figs. 10 and 11;

Fig. 13 is a side elevational view of a replica illustrated in turned-over or reversed position and attached magnetically through the graphed sheet to the ferrous surface of the display board;

Fig. 14 is a transverse sectional view substantially on line 14—14 of Fig. 13;

Fig. 15 is a side elevational view of the unit of the set represented by Figs. 10–14 showing the replica rolled over on one of its sides, representing a similitude of condition of accident; and Fig. 16 is a transverse sectional view substantially on line 16—16 of Fig. 16.

The system of my invention provides scaled replicas of cars, individuals, obstructions, traffic insignia and other items associated with a traffic or accident problem where the replicas are provided with a continuous peripheral edge providing a guide for marking the outline of the device either upon the graphed traffic board or the graphed paper associated therewith. By reason of this edge associated with the replicas of the devices, a graphic outline may be made of the device practically in exact proportion to the actual device of which it is a replica. The magnet carried by the replica device enables the device to be readily moved into the pertinent positions representing the conditions of the accident over the graphed board or the graphed paper, to enable the accident to be reproduced progressively. The progressive steps in the traffic accident are distinguished by the use of series of models in color, each particular car being represented by a series of models having individual color. For example, plaintiff's car would be shown in four positions by a series of four models in red color, defendant's car by a series of models in yellow color, etc. That is to say, similar models located in progressively different positions are used to pictorially reproduce the events leading to the accident in a way which would make the situation minutely clear to the jury. The fact that a multiplicity of similar models of the same car involved in the accident may be inexpensively reproduced, enables such a series of models to be conveniently used in depicting the facts of the accident.

Moreover, the structure of the models, each including a peripheral sketching edge, enables an outline to be made for permanent record on the graphed paper for evidence purposes which will form part of the record on appeal when necessary.

The set of parts constituting the traffic display board consists of a portable, frame structure of light weight on which a ferrous sheet of material is mounted and which contains a writing surface for chalk and a graphed area; on which the scene of the accident can be readily sketched in scaled proportion to the accident area; a graphed sheet which may be superimposed upon the graphed board and the conditions of the accident sketched thereon; a set of scaled three-dimensional models reproducing in similitude the vehicles involved in the accident where each set of vehicles is constituted by a multiple number of units of a predetermined distinguishing color enabling the individual vehicles of each color set to be positioned on the graphed board or graphed paper in progressive positions to clearly and meticulously reproduce the progressive conditions culminating in the accident; model reproductions of people and traffic accessories such as signs and traffic lights for reproducing both location and appearance at the scene of the accident, where the vehicles and representations of people and the accessories each include permanent magnet means adapted to be attached to the ferrous display board; the set also including marking devices for marking by color and symbol the display board and the graphed paper in accordance with the testimony of witnesses and in color contrast that can be readily distinguished. By combination of the color markings and the distinguishing color sets of replicas of the vehicles and particularly the ability of certain of the individual units of each vehicle set to be magnetically attached to the display board in overturned and prone position, the conditions of the accident may be explained very clearly to a court and jury.

Referring more particularly to the drawings, reference character 1, designates a light weight wood frame over which the face of the board constituted by ferrous sheet 2 is mounted. Frame 1 has been referred to as wood but this may be aluminum or the light weight material to which the easel 3 is hinged and which may be folded to a position interiorly of the frame 1 to enable the display board to be readily mounted flat against a wall. The frame 1 is appropriately reinforced by diagonal braces 4 and 5 to which a handle 6 is secured enabling the board to be readily carried into a court room for demonstration of the facts of the case before the court and jury. Suitable confining chains 7 and 8 extend between braces 4 and 5 and the easel 3 for limiting the movement thereof when the board is erected on the floor or a table before the court and jury. The front of the display board is graphed as represented in Fig. 1, and is capable of being marked by chalk in appropriate colors for explaining the conditions of the accident. The display board is scaled, for example, 4' to 1" to facilitate the drawing out of the conditions of the accident in proper proportion. For example, in Fig. 1 I have shown the intersection marked on the graphed surface and within the intersection I have illustrated the conditions of a typical accident, with the vehicles indicated in progressive positions leading up to the accident. For example, the plaintiff explains his case by the election of a series of models of vehicles of one color, such as red, to represent his (plaintiff's) vehicle, which I have represented at 11, 12, 13 and 14, magnetically attached to the ferrous material of the display board 2. In addition the plaintiff would explain his case by the election of a second series of models of vehicles of a second color, such as yellow to represent the vehicle of the defendant, and if a third vehicle were involved in the accident the plaintiff would elect a third series of models of a third color, such as blue, to represent the vehicle of the third party. Note particularly that the plaintiff's vehicle, having once been placed in position on the board, is not shifted in position but instead another one of the units of the red set is placed in a progressive position until finally the model car indicated at 14 as being turned over and in reverse position is magnetically attached to the display board. The defendant in presenting his case would use the same color series as the plaintiff, i.e., a series of vehicles in red color for plaintiff's vehicle, a series of vehicles in yellow color to represent defendant's vehicle and a series of vehicles in blue color to represent the vehicle of a third party. The vehicle of the defendant, according to the testimony of the plaintiff, is shown at 17, 18, 19 and 20 and the vehicle of an additional party, according to the testimony of the plaintiff, is shown at 15 and 16. It will be noted that the last position of vehicle 20 is prone and the vehicle is attached magnetically on one side thereof, for properly illustrating the conditions of the accident. In addition to the several vehicles illustrated in the example shown in Fig. 1, traffic accessories may be attached in position as indicated at 21. Such traffic accessories are of various descriptions such as the sign of Fig. 8, shown at 22. Pedestrians are readily located on the display board at positions 23, 24 and 25, for example. It will be noted that the pedestrian illustrated at 25 is in a prone position. All of the accessories and the pedestrians, etc., are magnetically attached to the display board through an appropriate permanent magnet such as 26 in Fig. 8 which attaches securely to the ferrous surface of the display board. Various other traffic obstructions and obstacles are represented in similitude on the display board such as the tractor-trailer represented at 26, consisting of the tractor 27 and the trailer 28, detachably connectable thereto. The tractor 27 is a molded facsimile of a standard tractor and includes the permanent magnet 29 molded therein and attachable to the ferrous surface of the display board 2. The tractor includes a sketching edge portion 30 thereon forming a guide for enabling a graphic outline to be made of the position of the tractor with respect to other vehicles, pedestrians, or traffic accessories on the graphed sheet or the graphed board. The trailer 28 is also provided with a sketching edge portion 31 which is maintained in immediate contact with the surface of the ferrous display board 2 by means of the embedded permanent magnets 32 and 33. The trailer is hinged to the tractor 27 by means of a bolt 34 and wing nut assembly 35 enabling the trailer to be readily detached or attached to the tractor.

The sets of scaled models of vehicles are represented in Figs. 10–16 as replicas of conventional automobiles. These sets constitute units which are molded in such manner that a continuous sketching edge is provided around that part of the unit which is magnetically attached to the ferrous display board 2. For example, the car of Figs. 10–12 is constituted by a model formed from molded material reproducing the conventional appearance of an automobile represented at 36 and in which the permanent magnet 37 is embedded for magnetically attaching the replicas to the ferrous surface of the display board 2. Figs. 10–12 show a replica of an automobile in its normal position and terminating in a peripheral sketching edge 38 by which an outline of the vehicle may be readily made on the graphed paper or upon the surface of the display board. There are generally four such similarly colored units of the type represented in Figs. 10–12 in each set of parts furnished with the equipment, two of which are in erect position.

A third similarly colored unit in the set of parts is shown in Figs. 13 and 14 as consisting of a molded replica 39 of a vehicle arranged in reverse or overturned position. This molded unit has a supporting portion representing the top of the vehicle which extends from a flat plane represented at 40. This flat plane terminates in a peripherally extending sketching edge 41 enabling a graphic outline to be made of the vehicle in overturned position upon the graphed paper or the graphed board. The molded unit includes a permanent magnet 42 embodied in the flattened top portion of the unit and operating to magnetically secure the unit to the ferrous surface of the display board 2.

The last unit of the set of replicas is represented in Figs. 15 and 16 in which the molded replica 43 represents a passenger car in prone position, that is, flattened on its left side 44 and having embedded therein the permanent magnet 45 for attachment of the prone device to the ferrous surface of the display board 2. The flattened surface terminates in a continuous sketching edge 46 enabling an outline to be made of the device from prone position, either upon the graphed paper or the graphed surface of the display board.

In Figs. 3 and 4 I have shown more clearly the manner in which the graphed paper sheet 47 may be laid over the graph on the ferrous surface 2 of the display board. The graphed paper sheet 47 is initially fastened to the frame 1 by suitable sticky tape, such as "Scotch Tape" 48, but as the representation of the accident progresses the adherence of the several replicas, traffic insignias, obstacles, the tractor-trailer and other vehicles through the graphed paper 47 by attraction of the permanent magnets in the models with respect to the ferrous surface of the display board 2 serve to further maintain the graphed paper in position with respect to the surface of the board. The conditions prevailing at the scene of the accident are sketched on the graphed paper 47, as represented more clearly in Figs. 5 and 6, where a pencil or crayon 49 is quickly guided around the sketching edge 38 of the model 36 to reproduce the position of the vehicle unit on the graphed paper or the ferrous surface of the display board 2. As represented in Fig. 4, a marking pencil of crayon is used to outline the street intersection shown at 50, the marking being applied either directly upon the surface of the display board as shown in Fig. 1 or upon the graphed paper 47 as shown in Fig. 4. When the scene of the accident has been completed in similitude on the graphed paper 47, this paper is removed from the display board and is folded as represented in Fig. 7 to conveniently fit within a file and to enable it to be offered in evidence and to become part of the appeal record in the case, if the case is carried to a higher tribunal.

In the trial of a traffic case the method of my invention enables the facts to be progressively recorded and explained before the court and jury. All moving objects (such as vehicles and people) and the relationship thereof to traffic insignias, and accessories, are presented in a chronological series of steps. For example, the plaintiff is represented by a series of models 11, 12, 13 and 14 of one color (red), the vehicle of the defendant by a series 17, 18, 19 and 20 of a second color (yellow), and the vehicle of an additional party in a third series of models 15 and 16 (blue). To illustrate, plaintiff was traveling east on the Trindle Road, defendant was traveling south on Route 514; when plaintiff was 72 feet west of the intersection (place red car 11) he saw defendant 12 feet north of the intersection (place yellow car 17) traveling south and slowing for the stop sign at the intersection; a tractor-trailer traveling east on the Trindle Road was stopped at the western line of the intersection in the middle of the Trindle Road, waiting to make a left hand turn (place tractor-trailer 26—27); plaintiff attempted to pass the tractor-trailer on the right and when plaintiff was 8 feet west of the intersection (place red car 12) he saw that defendant's vehicle had failed to stop for the stop sign and had entered the intersection approximately 8 feet (place yellow car 18); the front of the vehicle of the defendant struck the left front of the vehicle of the plaintiff in the southeastern section of the intersection (place yellow car 19 and red car 13); the vehicle of the defendant stopped on its left side 16 feet east of the intersection on the southern line of Trindle Road (place yellow car 20); the vehicle of the plaintiff stopped in an upside down position at the southeastern corner of the intersection (place red car 14). A pedestrian was walking north along the southeastern side of Route 514 (place pedestrian 24); the pedestrian was knocked down by plaintiff's vehicle (place pedestrian 25); the vehicle of a third party was traveling west on Trindle Road and turned north into Route 514 (place blue cars 15 and 16).

Where no record is desired the chalk board 12 is used; where a record is desired the graphed paper 47 is used. In marking the graphed paper the testimony of each witness can be distinguished by both color and symbol. The location of the vehicles according to the testimony of the plaintiff in the above illustration would be outlined in green crayon. Further, if necessary the positions of plaintiff's vehicle would be marked chronologically "P-pf 1," "P-pf 2," "P-pf 3," "P-pf 4," while the positions of defendant's car would be marked "P-df 1," "P-df 2," "P-df 3," "P-df 4." The chronological positions of the vehicles according to defendant's testimony would be outlined in red crayon and symboled "D-pf 1," "D-df 1," "D-pf 2," "D-df 2," etc. Note that the locations of the vehicles according to the testimony of any witness for the plaintiff would be marked by still another color and symboled "PA-pf 1," etc., and the same would be true of the testimony of any witnesses for defendant. The locations of stop signs, pedestrians, and any other pertinent testimony would also be marked on the graphed paper. Depending on the circumstances one sheet of graphed paper would be used for all witnesses or individual sheets of graphed paper would be used for each witness.

One of the most useful applications of the traffic board, vehicle replicas and accessories is for purpose of conferences between a client and his attorney in explaining the accident, or a conference between the representatives of the insurance company and the claimant; or a conference between witnesses of the accident and the attorney. The attorney simply marks out the sheets and has the client or witness show him how the accident happened. The attorney then outlines the vehicles and objects and makes the appropriate markings. The attorney removes the graphed paper and puts it in the file. Some time later the attorney may be instructed to draft the complaint and in that event he simply gets the graphed paper from his file, replaces it on the board, replaces the models on the outlines and he has reconstructed the accident scene which is a great aid to the attorney in drafting the complaint.

The system of marking by color or symbol insures the making of an accurate record in such manner that the testimony of each party or the testimony of each witness can be distinguished.

The fact that the display board is constructed in a manner that it is extremely light in weight enables the board to be used in the attorney's office to obtain an accurate understanding of the facts of the accident and thereafter transported with the replicas of the vehicles and the traffic accessories into the court room and set up to re-enact the traffic scene for the benefit of the court and jury.

While I have described my invention in certain of its preferred embodiments, I realize that modifications may be made, and I desire that it be understood that no limitations upon by invention are intended other than may be imposed by the scope of the appended claims.

What I claim as new and desire to secure by Letters Patent of the United States is as follows:

1. A display apparatus for depicting conditions of a vehicle traffic accident comprising a graphed display board of ferrous material having a surface for receiving markings of the environments of the traffic accident and sets of contrastingly colored replicas of vehicles involved in the accident, said sets each including a replica of the vehicle in normal position, a replica in overturned position and a replica in prone position, magnetic means associated with each replica for attachment to the ferrous material of the display board, said replicas each having the shape and contour of the vehicle represented thereby and a laterally projecting graphic guide extending peripherally around the edge of each replica and establishing surface contact with the surface of the graphed board and forming peripheral guides in contact with the surface of the board for marking thereon outlines of the replicas in accordance with the placement thereof on said board.

2. A vehicle replica for reproducing in similitude on the surface of a display board of ferrous material the position of a vehicle under conditions of accident, which comprises a vehicle replica in overturned position and terminating in a plane surface adapted to establish surface to surface contact with the surface of the display board, a permanent magnet embedded wholly within the replica and terminating coplanar with the surface thereof and a continuous sketching edge projecting laterally beyond the sides of the replica and extending peripherally of the junction of the edge of the surface of the overturned position of the replica and in magnetic surface contact with the surface of the display board.

3. A display system for depicting conditions of a vehicle traffic accident comprising a graphed display board of ferrous material having a surface for receiving markings of the environments of the traffic accident, an overlay graphed sheet adapted to be spread and maintained in position on the graphed display board for receiving corresponding markings of the environments of the traffic accident, and sets of contrastingly colored replicas of vehicles involved in the accident, said sets constituting a multiplicity of units each terminating in a flat surface adapted to establish surface to surface contact with the surface of said overlay graphed sheet and having a peripheral sketching edge thereon extending in surface contact with the surface of said display board, said sketching edges projecting beyond the sides of said unit, said units corresponding in shape and contour to the vehicle involved in the accident with the flat surfaces of the said units differentially formed thereon for supporting said units in normal, overturned or prone positions with respect to the surface of said overlay sheet and said display board, permanent magnets disposed within the flat surface of each of said units for maintaining said units in surface to surface contact with respect to said overlay sheet and the ferrous surface of the display board while marking a graphic peripheral outline of said units on said overlay sheet, said overlay sheet being removable from said display board and foldable to a position forming a permanent record.

References Cited in the file of this patent

UNITED STATES PATENTS

| 1,625,041 | Marshall | Apr. 19, 1927 |
| 1,973,900 | Hylander | Sept. 18, 1935 |
| 2,254,810 | Will | Sept. 2, 1941 |
| 2,668,370 | Trimble | Feb. 9, 1954 |
| 2,722,754 | Slote | Nov. 8, 1955 |

FOREIGN PATENTS

| 5,853 | Great Britain | 1908 |
| 428,952 | Great Britain | May 22, 1935 |